(12) United States Patent
Montalvo et al.

(10) Patent No.: US 8,752,591 B2
(45) Date of Patent: Jun. 17, 2014

(54) KINK, CRUSH, AND BURST RESISTANT FLEXIBLE HOSE

(75) Inventors: Anthony Montalvo, Medina, OH (US); Robert H. Vogliano, Tallmadge, OH (US); Marc Borowczak, N. Canton, OH (US)

(73) Assignee: Veyance Technologies, Inc, Fairlawn, OH (US)

( * ) Notice: Subject to any disclaimer, the term of this patent is extended or adjusted under 35 U.S.C. 154(b) by 602 days.

(21) Appl. No.: 13/093,048

(22) Filed: Apr. 25, 2011

(65) Prior Publication Data

US 2011/0303317 A1  Dec. 15, 2011

Related U.S. Application Data

(60) Provisional application No. 61/353,503, filed on Jun. 10, 2010.

(51) Int. Cl.
*F16L 11/00* (2006.01)
*F16L 11/112* (2006.01)
*F16L 11/08* (2006.01)

(52) U.S. Cl.
CPC ............. *F16L 11/112* (2013.01); *F16L 11/088* (2013.01)
USPC ........... 138/122; 138/121; 138/124; 138/173; 138/132

(58) Field of Classification Search
CPC ......... F16L 11/00; F16L 11/02; F16L 11/112; F16L 11/086; F16L 11/088; B32B 1/08
USPC ................ 138/121–126, 173, 132; 428/36.91
See application file for complete search history.

(56) References Cited

U.S. PATENT DOCUMENTS

| | | | | |
|---|---|---|---|---|
| 2,515,929 A * | 7/1950 | Ofeldt | | 239/424 |
| 3,073,353 A * | 1/1963 | Rittenhouse | | 138/148 |
| 3,253,618 A * | 5/1966 | Cook | | 138/125 |
| 3,790,419 A | 2/1974 | Atwell et al. | | |
| 4,262,704 A * | 4/1981 | Grawey | | 138/130 |
| 4,431,034 A | 2/1984 | Abdullaev | | |
| 4,989,643 A * | 2/1991 | Walton et al. | | 138/126 |
| 7,140,395 B2 * | 11/2006 | Furui et al. | | 138/126 |
| 7,493,917 B2 * | 2/2009 | Hirai et al. | | 138/126 |
| 7,658,208 B2 | 2/2010 | Burrowes et al. | | 138/126 |
| 2003/0178083 A1 | 9/2003 | McCaughtry | | |
| 2005/0121095 A1 * | 6/2005 | Ono et al. | | 138/126 |
| 2008/0072986 A1 | 3/2008 | Burrowes et al. | | |
| 2009/0133769 A1 * | 5/2009 | Riley et al. | | 138/122 |
| 2009/0236004 A1 * | 9/2009 | Jani et al. | | 138/127 |
| 2010/0071795 A1 | 3/2010 | Montalvo et al. | | 138/126 |

FOREIGN PATENT DOCUMENTS

FR  1075332  10/1954
WO  WO2009084339  7/2009

* cited by examiner

*Primary Examiner* — Patrick F Brinson
(74) *Attorney, Agent, or Firm* — Alvin T. Rockhill

(57) ABSTRACT

The flexible hose of the present invention is crush resistant, burst resistant, and virtually impossible to kink in normal use and is applicable to hoses that are designed for delivering virtually any kind of fluid including water, organic liquids, aqueous based herbicides, aqueous based insecticides, industrial chemicals, beverages, air, industrial gases, vacuum, and the like. The hose design of the present invention is particularly applicable to garden hoses for the delivery of water. In fact, garden hoses having the construction of the present invention are highly resistant to kinking and almost never kink when being used in conventional lawn, garden, and cleaning applications.

20 Claims, 5 Drawing Sheets

KINK, CRUSH, AND BURST RESISTANT FLEXIBLE HOSE

The benefit of U.S. Provisional Patent Application Ser. No. 61/353,503, filed on Jun. 10, 2010, is claimed hereby. The teachings of U.S. Provisional Patent Application Ser. No. 61/353,503 are incorporated herein by reference in their entirety.

FIELD OF THE INVENTION

This invention relates generally to flexible hoses and, more particularly, to flexible hoses having a hose construction that is kink, crush, and burst resistant.

BACKGROUND OF THE INVENTION

Flexible hoses are widely utilized in countless applications. For instance, garden hoses are used for watering grass, trees, shrubs, flowers, vegetable plants, vines, and other types of vegetation. Garden hoses are also commonly used to supply water for cleaning houses, buildings, boats, equipment, vehicles, animals, and the like. Fluids, such as beverages, fuels, liquid chemicals, gases and air are also frequently delivered from one location to another through a flexible hose.

Flexible hoses have been manufactured for decades out of natural rubber, synthetic rubbers, thermoplastic elastomers, and plasticized thermoplastic materials. Conventional flexible hoses commonly have a layered construction that includes an inner tubular conduit, a spiraled, braided, or knitted reinforcement wrapped about the tubular conduit, and an outer cover.

Kinking is a problem that has been associated with flexible hoses since their commercialization and continues to be a problem today. Kinking is a phenomenon that may occur when the hose is doubled over or twisted. A consequence of kinking is that the flow of fluid through the hose can be either severely restricted or blocked. Kinking is a nuisance that causes the user to waste time unkinking the hose. Extreme kinking may occur when, for example, a newly purchased coiled garden hose is initially used. At the time of initial use, a coupling at one end of the hose is fastened to a faucet. The user typically grasps the opposite end of the hose and move away from the faucet without allowing the coiled hose to untwist. Kinking also occurs after the initial use as a consequence of routine movements by the user. Virtually everyone that has used in garden hose in cleaning or gardening has at one time or another been aggravated by a kinked hose.

When a hose kinks, the flow of fluid through the hose is blocked. The user must then attempt to remove the blockage by manual manipulation, such as by swinging the hose to relax the kink or approaching the kinked location and manually straightening the kink. A kink in a garden hose may require the user to return to the faucet, shut off the flow of water at the faucet to release the fluid pressure in the hose, and then manually unkink the hose. The user suffers further inconvenience because he or she must walk back, reestablish the flow of water through the hose, and then return to the opposite end of the hose to continue use. An even more acute problem arises when the user has already attached a large sprinkler device, such as an oscillating sprinkler to the end of the hose, and is forced to untwist the hose with the sprinkler attached.

The tendency of flexible hoses to kink may be at least partially alleviated by winding a helical wrap about the exterior of the inner tubular conduit. However, because of the choice of construction materials for the wrap and conduit, such kink resistant hoses achieve enhanced flexibility by sacrificing crush resistance to an externally applied force. When these reinforced hoses are deformed, for example by walking on or driving over them with a car, the helical wrap tends to permanently deform. The permanent deformation that results from being crushed restricts path for fluid to flow through the hose. Another approach for increasing the kink resistance of flexible hoses is to increase the wall thickness of the tubular conduit. However, increasing the wall thickness sacrifices hose flexibility such that these hoses are more cumbersome for a user to handle and manipulate. Increasing the wall thickness also makes the hose heavier and accordingly more difficult to move and use.

U.S. Pat. No. 7,658,208 discloses a flexible hose that is depicted as having kink, crush, and burst resistance. The flexible hose described in U.S. Pat. No. 7,658,208 is comprised of: a tubular member comprising a sidewall aligned along a longitudinal axis and a lumen radially inside said sidewall, said tubular member comprising an ethylene-octene interpolymer comprising polymerized units of ethylene and 1-octene, wherein the interpolymer is characterized by an average block index greater than zero and up to about 1.0 and a molecular weight distribution, $M_w/M_n$, greater than about 1.3 and a helical reinforcement strip at least partially embedded within said sidewall of said tubular member and helically wound with a pitch about said lumen of said tubular member, said reinforcement strip comprising a blend of polypropylene and an ethylene-butene interpolymer of ethylene and 1-butene, where the ethylene-butene interpolymer is characterized by an average block index greater than zero and up to about 1.0 and a molecular weight distribution, $Mw/Mn$, greater than about 1.3.

United States Patent Application Publication No. 2010/0071795 A1 also describes flexible hoses having a kink, crush, and burst resistant construction. A hose revealed by United States Patent Application Publication No. 2010/0071795 A1 is comprised of an inner tubular member; an outer tubular member; a yarn layer disposed between the inner and outer tubular members; and a plurality of reinforcement strips within the outer tubular member and helically wound with a pitch about the lumen of the tubular member, wherein the outer tubular member is composed of a first compound containing an olefin block copolymer and a styrene/ethylene-butylene/styrene-based thermoplastic elastomer, and the reinforcement strips are composed of a second compound containing a thermoplastic elastomer and a polypropylene homopolymer.

SUMMARY OF THE INVENTION

The flexible hose of the present invention is crush resistant, burst resistant, and virtually impossible to kink in normal use. The hose construction of the present invention is applicable to hoses that are designed for delivering virtually any kind of fluid including water, organic liquids, aqueous based herbicides, aqueous based insecticides, industrial chemicals, beverages, air, industrial gases, vacuum and the like. The hose design of the present invention is particularly applicable to garden hoses for the delivery of water. In fact, garden hoses having the construction of the present invention are highly resistant of kinking and almost never kink when being used in conventional lawn, garden, and cleaning applications.

This invention is based upon the unexpected finding that the kink resistance of hoses can be greatly improved by incorporating a fabric reinforcing layer having a special construction therein. This special construction allows for an increase in ratio of bend stiffness to torsional stiffness which causes the hose to have a propensity to twist rather than kink. For the first time, the flexible hoses of this construction take advantage of this methodology to resist kink formation. This fabric reinforcing layer is located between the inner tubular layer and the outer tubular layer of the hose. The construction employed in the fabric reinforcing layer includes a first plurality of reinforcing cords which extend spirally through the hose and are substantially parallel to each other and a second plurality of reinforcing cords which extend spirally through the hose and are substantially parallel to each other. In this construction, the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose. In addition to the special fabric reinforcing layer, the hoses of this invention also utilize one or more reinforcing strips which are at least partially embedded within the outer tubular layer. These reinforcing strips are helically wound in the direction of angle β with respect to the orientation of the reinforcing cords.

The present invention more specifically discloses a kink, crush, and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose.

In the hose construction of the present invention the cords in the first plurality of reinforcing cords and the cords in the second plurality of reinforcing cords are spirally wound to form the fabric reinforcing layer. In this construction the cords in the fabric reinforcing layer are in the form of a non-woven matrix wherein all of the cords wound at angle α either pass over or pass under all of the cords wound at angle β. The kink, crush, and burst resistant hose of the subject invention typically has a ratio of bend stiffness to torsional stiffness which is greater than 1.0, preferably greater than 1.2, and most preferably greater than 1.3.

BRIEF DESCRIPTION OF THE DRAWINGS

The accompanying drawings which are incorporated herein constitute a part of this specification and illustrate various embodiments of the subject invention. These drawings are intended to be used in conjunction with the written description to provide clear understanding of the nature and scope of the subject invention. It should be understood that in referencing the figures submitted herein and in understanding the hoses of this invention that mirror images of such hoses are within the nature and scope of the invention. It should accordingly be understood that the angle α and the angle β depicted and described herein can be interchanged to depict the minor image of the drawings and descriptions provided herein.

FIG. 4 illustrates a hose wherein the helically wound reinforcing strips are partially embedded within the outer tubular layer.

DETAILED DESCRIPTION OF THE INVENTION

Figure 1:
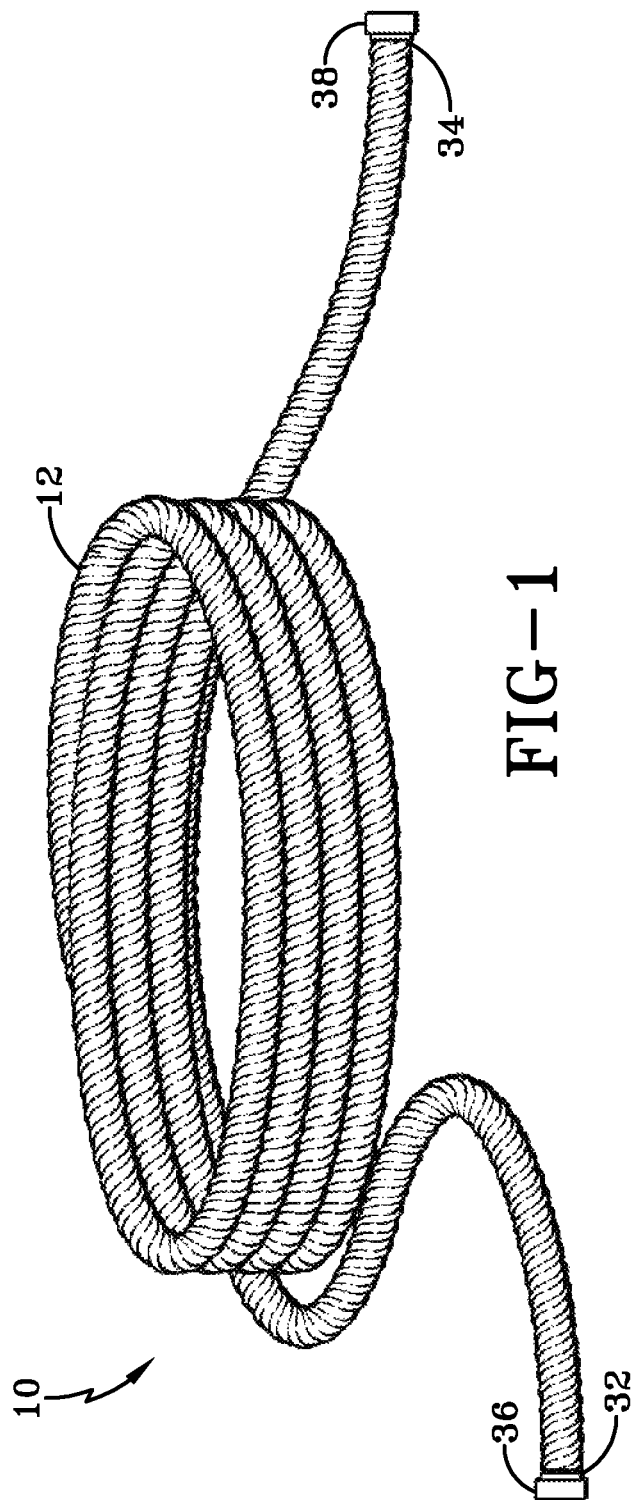
FIG. 1 is a perspective view of a garden hose construction in accordance with one embodiment of the subject invention.

The flexible hose of this invention has a longitudinal axis 30 that is diametrically centered within the lumen 28 of the hose 10. The hose 10 extends axially for an indefinite length along the central longitudinal axis 30 and has a length that may vary depending upon the intended use. In some cases the hose may be relatively short. However, the benefit attained by utilizing the highly kink resistant design of this invention is of the greatest value in longer hoses which are more susceptible to kinking. In many cases the flexible hoses of this invention will be 10 feet (3 meters) to 300 feet (91 meters) long. The flexible hoses of this invention will commonly be 20 feet (6 meters) to 200 feet (61 meters) long. For instance, garden hoses having the construction of this invention will typically be 25 feet (8 meters) to 100 feet (30 meters) long. The flexible hoses of this invention typically have an inside diameter which ranges from about 0.125 inch (0.3 cm) to about 2 inches (5 cm) or even larger. The inside diameter of the flexible hoses of this invention is commonly within the range of 0.25 inch (0.6 cm) to 1 inch (2.5 cm) and is frequently within the range of 0.5 inch (1.3 cm) to 0.75 inch (1.9 cm).

Hose 10 may be adapted for use in a wide variety of industrial or household applications. One commercial application for hose 10 is a garden or water hose for household or industrial use. Another commercial application for hose 10 is a drop hose mainly used for the transfer of various fluids including, but not limited to, gasoline, petroleum-based products, chemicals, petrochemicals, and fluid food products. Hose 10 may be also used to make pneumatic hoses for use in conjunction with pneumatic tools and other fluid actuated devices. The flexible hoses of this invention are also useful in conjunction with central vacuum cleaner systems for homes and other buildings.

Opposite ends 32, 34 of the flexible hose 10 are typically terminated by conventional hose fittings 36, 38, respectively, used for coupling the flexible hose 10 to complementary hose fittings (not shown) of a fluid source, a water faucet, a fluid drain, a fluid dispenser, or even another flexible or rigid hose or conduit. However, in one embodiment of this invention the flexible hose is not terminated with a coupling on one or both of the ends thereof.

The flexible hose of this invention is of the general construction as illustrated and described in United States Patent Application Publication No. 2010/0071795 A1 and can typically be manufactured using the materials described therein. However, in making the hoses of this invention the fabric reinforcing layer described herein is substituted for the yarn layer described in United States Patent Application Publication No. 2010/0071795 A1. It should be understood that specific hose constructions and materials that go beyond the embodiment disclosed in United States Patent Application Publication No. 2010/0071795 A1 can be employed in the flexible hoses of this invention. In any case, the teachings of United States Patent Application Publication No. 2010/0071795 A are incorporated herein for the purpose of teaching a hose construction and materials that can be utilized in manufacturing the kink resistant hoses of this invention.

The flexible hoses of the present invention include (1) an inner tubular layer, (2) a fabric reinforcing layer having the special construction of this invention, (3) an outer tubular layer, and (4) at least one helically wound reinforcing strip which is at least partially embedded within the outer tubular layer. The hose 10 may be manufactured or fabricated using extrusion techniques known to a person having ordinary skill in the art. In one embodiment, the inner tubular layer (inner tubular member) 24 is formed as an extrusion and the fabric layer 22 is applied to the exterior of the inner tubular layer 24 by winding the reinforcing cords onto the inner tubular layer. A portion of the outer cover 12 is then applied over the fabric reinforcing layer, and the reinforcement strips 14, 16, 18, 20 are applied in a die spinning process, and then the remainder of the outer cover 12 is applied.

The inner tubular layer 24 is formed from a low modulus rubber or thermoplastic elastomer or similar material that is chemically resistant, chemically inert, and resistant to permeation by the fluid conveyed through the lumen 28. The inner tubular layer 24 lends strength to the hose 10 for increasing the burst pressure and operates in this regard with the yarn layer 22 and reinforcement strips 14, 16, 18, 20 to provide a relative high burst pressure. The inner tubular member 24 is relatively flexible with a low initial modulus so that the hose 10 is not overly stiff or rigid.

The formulation for the material forming the inner tubular layer 24 may comprise a compound of a polypropylene homopolymer and an olefin block copolymer. In particular, the polypropylene homopolymer may be H110-02N polypropylene and the olefin block copolymer may be Infuse D9107 blended in a ratio of about 90 weight percent olefin block copolymer to about 10 weight percent polypropylene homopolymer. The low modulus material from which the inner tubular member 24 is formed may include from 0.5 weight percent to 2.0 weight percent of pigments and/or dyes to provide a color and additives, such as ultraviolet stabilizers, heat stabilizers, antioxidants, antiozonants, lubricants, and the like.

The material employed in making the inner tubular layer and the low modulus portion of the outer tubular layer can also be natural rubber, a synthetic rubber, a thermoplastic elastomer, or a plasticized thermoplastic material, such as polyvinyl chloride (PVC). It should be appreciated that the inner tubular layer and the low modulus portion of the outer tubular layer can be made from the same or different materials or combination of materials. Natural rubber, styrene-butadiene rubber, synthetic polyisoprene rubber, polybutadiene rubber, nitrile rubber, and various blends thereof can be formulated to offer excellent physical and chemical characteristics, such as excellent durability, low temperature flexibility, and chemical resistance. However, it is typically necessary to cure such natural and synthetic rubber containing formulations with sulfur or a sulfur-containing curing agent and to include one or more antidegradants in the formulation thereof. Thermoplastic elastomers and thermoplastic resins offer the advantage of not needing to be cured. However, a plasticizer is needed in formulations made with thermoplastic resins, such as PVC to attain needed levels of flexibility.

In one embodiment of this invention, the low modulus material constituting the inner tubular layer 24 exhibits an initial modulus in a range between about 200 psi (1.4 MPa) and about 5,000 psi (34.5 MPa). The initial modulus of the low modulus material is frequently in the range of 3,500 psi (24.1 MPa) about 4500 psi (31.2 MPa). The minimum tensile strength for the low modulus material may be as low as about about 800 psi (5.5 MPa) and is preferably at least 900 psi (6.2 MPa).

Figure 4:
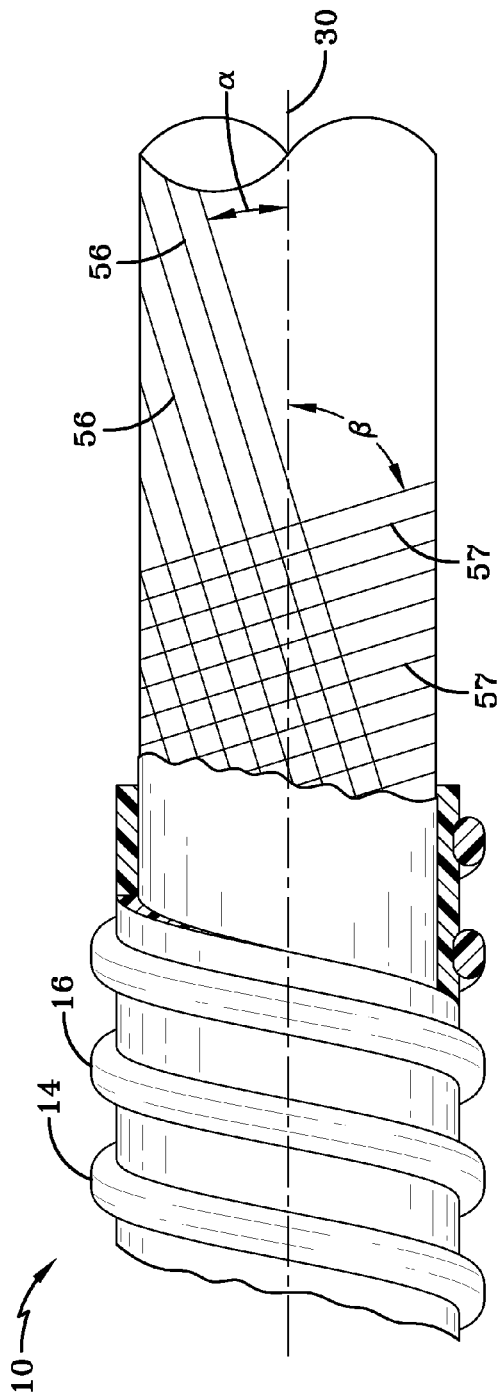
FIG. 4 is a view illustrating the orientation of the cords in the fabric reinforcing layer in relation to the longitudinal axis of the hose.

The fabric reinforcing layer is located between the inner tubular layer and the outer tubular layer. It is typically applied to the inner tubular layer in manufacturing the hose of this invention by winding strands of reinforcing cord onto the inner tubular layer. In doing so, one or more cords are wound at an angle $\alpha$ which is within the range of 20° to 50° of the longitudinal axis of the hose to form the first plurality of cords in the reinforcing layer. Then, one or more cords are wound at an angle $\beta$ which is within the range of 60° to 85° of the longitudinal axis of the hose to form the second plurality of cords in the reinforcing layer. It should be noted that the angle $\alpha$ and the angle $\beta$ are mutually opposite with respect to the longitudinal axis of the hose as is illustrated in FIG. 4. The cords in the first plurality of cords in the fabric reinforcing layer are typically wound at an angle $\alpha$ which is within the range of 25° to 35° of the longitudinal axis of the hose with the cords in the second plurality of cords being wound at an angle $\beta$ which is within the range of 75° to 85° of the longitudinal axis of the hose. The cords in the first plurality of cords 56 in the fabric reinforcing layer are more typically wound at an angle $\alpha$ which is within the range of 27° to 33° of the longitudinal axis of the hose with the cords in the second plurality of cords 57 being wound at an angle $\beta$ which is within the range of 77° to 83° of the longitudinal axis of the hose. It is also important as shown in FIG. 4 for the reinforcing strips 14 and 16 to be helically wound in the direction of $\beta$ wherein $\beta$ is an angle less than 90°. It should be noted that for purposes of this invention, angle $\alpha$ and angle $\beta$ are always less than 90°. The cords in the first plurality of cords in the hose will also preferably be somewhat slack (not fully taut). It has been found better torsional flexibility of the hose of this invention is maintained in cases where the first plurality of cords in the hose are slightly slack. In most cases, the first plurality of cords will be slack to a degree in which they can experience a strain within the range of 0.25% to 5%, typically within the range of 0.5% to 4%, and more typically will be within the range of 1% to 2% without exhibiting an increase in the level of stress.

The second plurality of cords is simply wound over the first plurality of cords to produce a spirally wound fabric reinforcing layer. It is accordingly a nonwoven fabric rather than being a knitted-type reinforcement or a mesh network. More specifically, in the hose construction of the present invention, the cords in the first plurality of reinforcing cords and the cords in the second plurality of reinforcing cords are spirally wound to form the fabric reinforcing layer. In this construction, the cords in the fabric reinforcing layer are in the form of a non-woven matrix wherein all of the cords wound at angle α either pass over or pass under all of the cords wound at angle β. The kink, crush, and burst resistant hose of the subject invention typically has a ratio of bend stiffness to torsional stiffness which is greater than 1.0, preferably greater than 1.2, and most preferably greater than 1.3.

Figure 7:
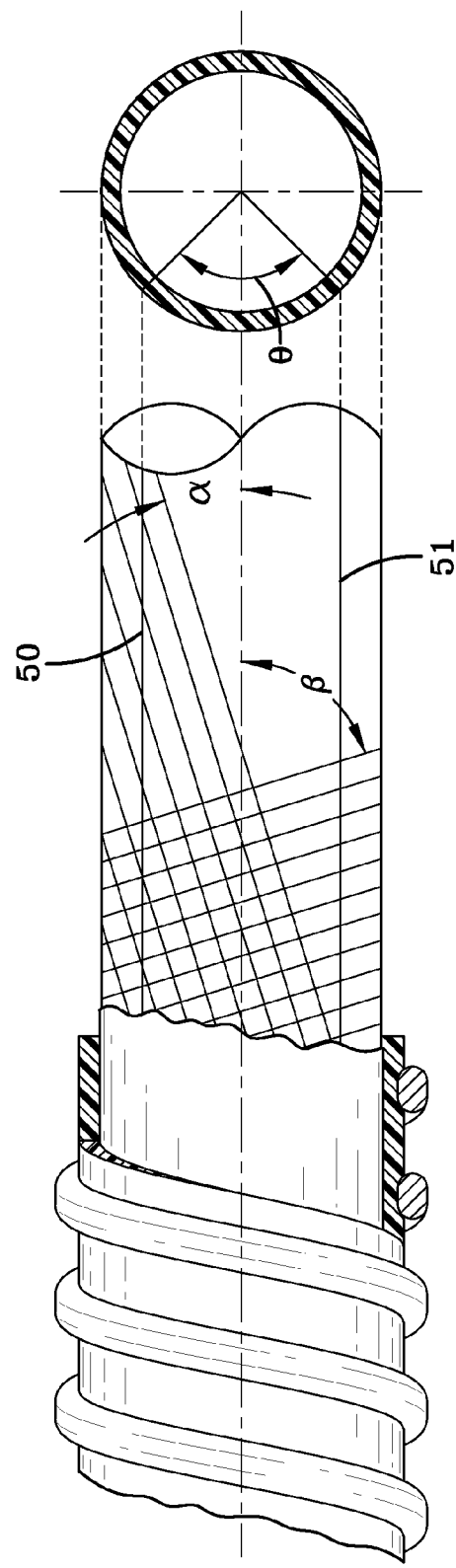
FIG. 7 is an illustration depicting a kink resistant flexible hose in accordance with one embodiment of this invention wherein the fabric reinforcing layer includes a first longitudinal reinforcing cord and a second longitudinal reinforcing cord.

The kink resistant flexible hose of this invention will preferably further include longitudinal cords in the fabric reinforcing layer. The number of the longitudinal cords included in the fabric reinforcing layer will typically range from 1 to about 20, will more typically be within the range of 1 to about 10 and will preferably be a number within the range of 1 to 5. The number of longitudinal cords included in the fabric reinforcing layer will typically be 1, 2, 3, or 4. FIG. 7 illustrates a kink resistant flexible hose in accordance with one embodiment of this invention wherein the fabric reinforcing layer includes a first longitudinal reinforcing cord 50 and a second longitudinal reinforcing cord 51. The angular spacing θ between the longitudinal cords utilized in reinforcing the hose will typically be within the range of 2 degrees to 90 degrees, will more typically be within the range of 4 degrees to 45 degrees, and will preferably be within the range of 5 degrees to 20 degrees. In cases where multiple longitudinal reinforcing cords are utilized in the hose all of the reinforcing cords will be present within this angular spacing θ which has a maximum separation of 90 degrees.

Figure 5:
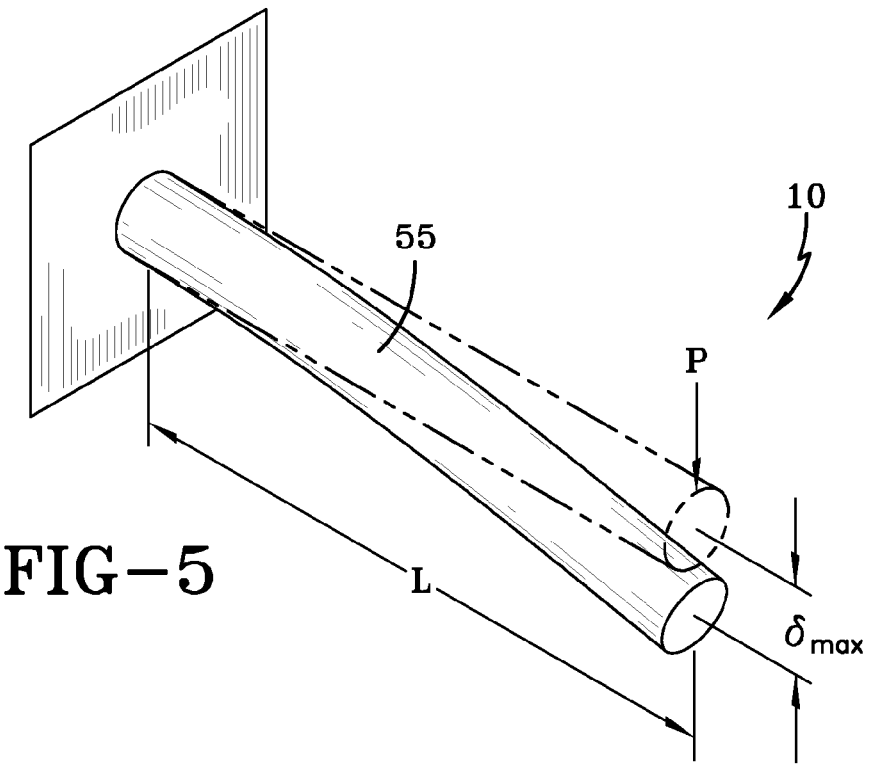
FIG. 5 is an illustration depicting the measurement of Bending stiffness (EI).

Bending stiffness (EI) is determined with reference to FIG. 5 according to the formula:

$$EI = \frac{PL^3}{3\delta_{max}}$$

wherein E represents Young's Modulus, wherein I represents the Moment of Inertia of the beam or hose section, wherein P represents the load applied at end of beam or hose section, wherein L represents the Length of beam or hose section, and wherein $\delta_{max}$ represents the Maximum deflection at end of beam or hose section.

Figure 6:
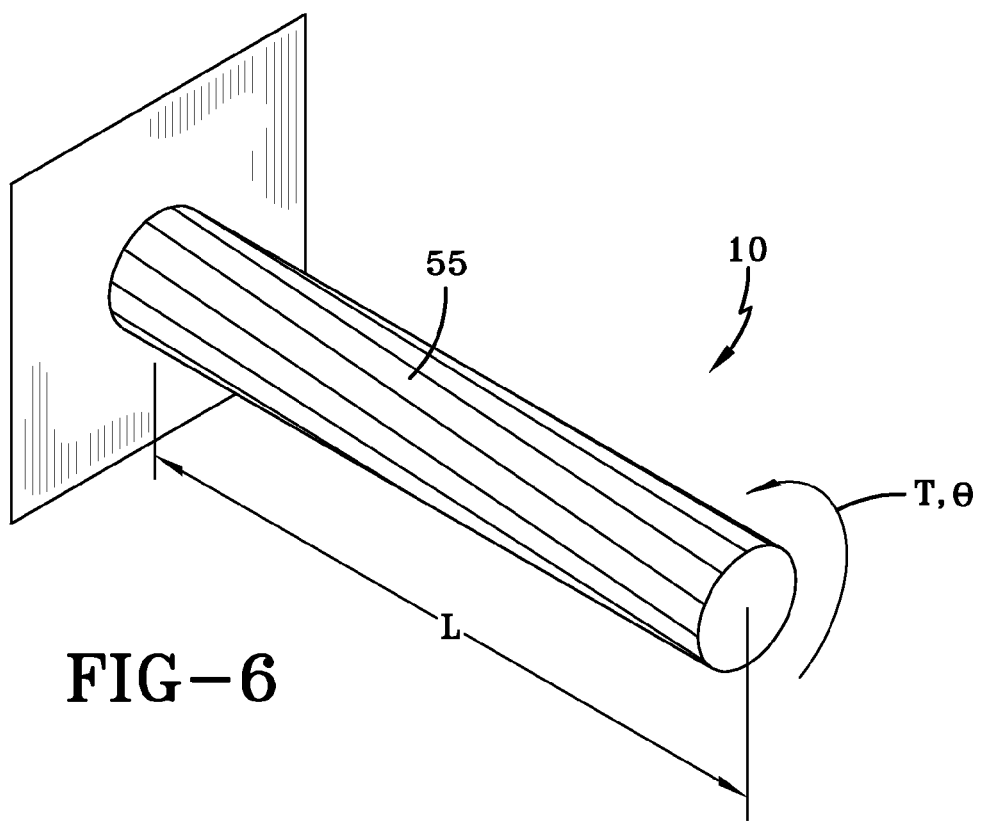
FIG. 6 is an illustration depicting the measurement of Torsional stiffness (GJ).

Torsional stiffness (GJ) is determined with reference to FIG. 6 according to the formula:

$$GJ = \frac{TL}{\theta}$$

wherein G represemts Shear Modulus, wherein J represents the Polar Moment of Inertia, wherein L represents the Length of beam or hose section, wherein T represents the Applied torque at end of the beam or hose section, and wherein θ represents the angular deformation or twist in radians.

It should be noted that the term "cords" as used herein includes monofilaments, multi-filament materials, yarns comprising a plurality of filaments, or cords which are comprised of a plurality of filaments and/or yarns that are wound or structured in any construction. The cords can be made utilizing a wide variety of natural and/or synthetic materials, such as cotton, polyester (such as polyethylene terephthalate or polyethylene naphthalate), nylon, rayon, aramid, carbon fiber, ceramic fibers (such as silicon carbide), polyvinyl alcohol (PVA), poly p-phenylene-2,6-benzobisoxazole (PBO), polypropylene, and the like. In some applications, metallic cords or hybrid cords, such as steel cords which can optionally be plated with brass or another alloy can be utilized in the fabric reinforcing layer. For instance, reinforcement with steel cords can be beneficially utilized in high pressure hoses such as hydraulic hoses and high pressure steam hoses.

The outer cover 12 is composed of a flexible material characterized by a low initial modulus so that the hose 10 is not excessively stiff. In particular, the low modulus material constituting the outer cover 12 is significantly more flexible (i.e., has a lower initial modulus) than the high modulus material constituting the reinforcement strip 14. In one aspect, the low modulus material constituting the outer cover 12 exhibits an initial modulus in a range from about 200 psi (1.4 MPa) to about 1,000 psi (6.9 MPa). In one embodiment, the initial modulus of the low modulus material is about 550 psi (3.8 MPa). The minimum tensile strength for the low modulus material may be about 800 psi (5.5 MPa), or greater. However, the minimum tensile strength may be as low as about 540 psi (3.7 MPa).

The formulation for the low modulus material constituting the outer cover 12 may be selected from the group consisting of olefin block copolymers (OBC), plasticized polyvinyl chlorides (PVC), plasticized polyvinyl chloride alloys, styrene/ethylene-butylene/styrene-based (SEBS) thermoplastic elastomers (TPE), thermoplastic vulcanizates (TPV), thermoplastic polyurethanes (TPU), polyolefin elastomers (POE), mixtures thereof, and the like. In an alternative embodiment of this invention, the low modulus material can be a thermoset material such as an ethylene propylene rubber (EPR) or an ethylene-propylene-diene rubber (EPDM). A particular olefin block copolymer for use in forming outer cover 12 is Infuse D9107 commercially available from The Dow Chemical Company (Midland, Mich.), which is characterized by a density of 0.866 grams per cubic centimeter (ASTM D792) and a melt mass flow rate of 1.0 grams per ten minutes (190° C./2.16 kg, ASTM D1238). In one embodiment, the low modulus material constituting the outer cover 12 may be composed of a 50:50 weight percent mixture of OBC and SEBS-based TPE. The low modulus material from which the outer cover 12 is formed may include from 0.5 wt. % to 2.0 wt. % of pigments to provide a color and additives like ultraviolet stabilizers, heat stabilizers, and lubricants. In one embodiment, the SEBS used in the low modulus material may be a compound containing 80 parts to 200 parts of oil and homopolymer, as well as fillers and additives.

The combination of a low modulus material for the outer cover 12 and a high modulus material for the reinforcement strips 14, 16, 18, 20 is selected to construct a hose 10 that, in comparison with conventional hose constructions, exhibits acceptable flexibility, kink resistance, and crush resistance under zero- and low-fluid pressure conditions without sacrificing strength that resists bursting. In certain embodiments of the invention, the materials for the outer cover 12 and reinforcement strips 14, 16, 18, 20 may be selected to operate under internal working fluid pressures ranging from about 15 psi (103 KPa) to about 500 psi (3.4 MPa).

Figure 2:
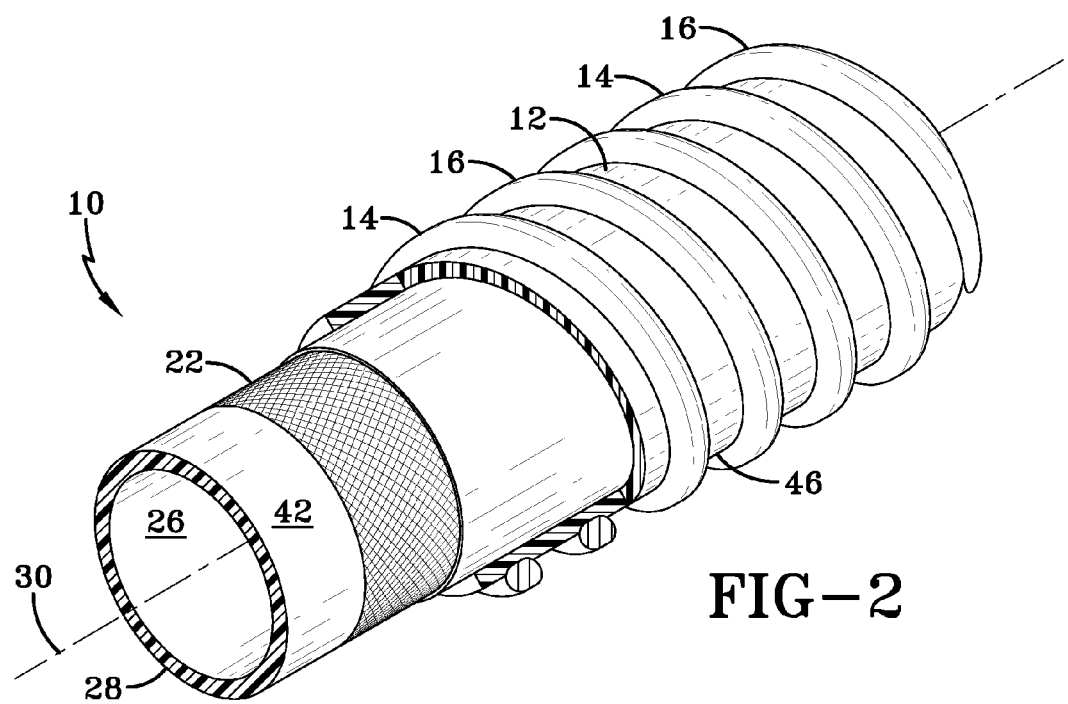
FIG. 2 is a perspective view of a portion of the hose of FIG. 1 in which the layers are partially removed for purposed of better illustration of the hose construction of this invention.
Figure 2A:
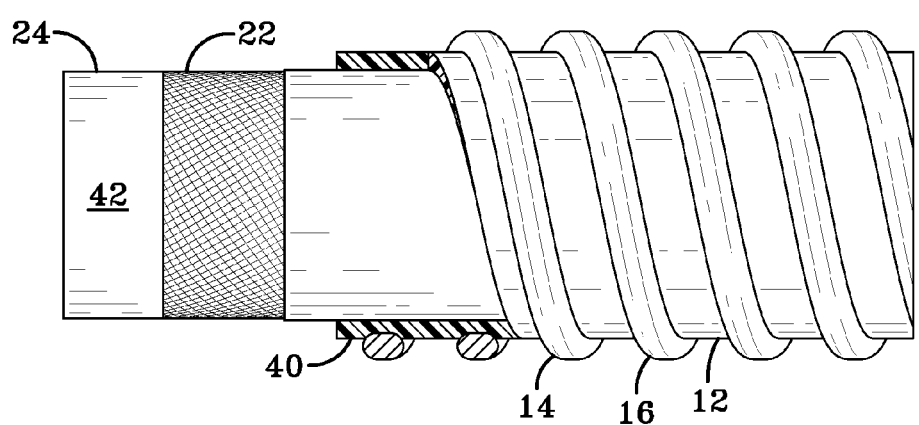
FIG. 2A is a side view of a portion of the hose of FIG. 1 in which the layers are partially removed for purposed of better illustration of the hose construction of this invention.
Figure 3:
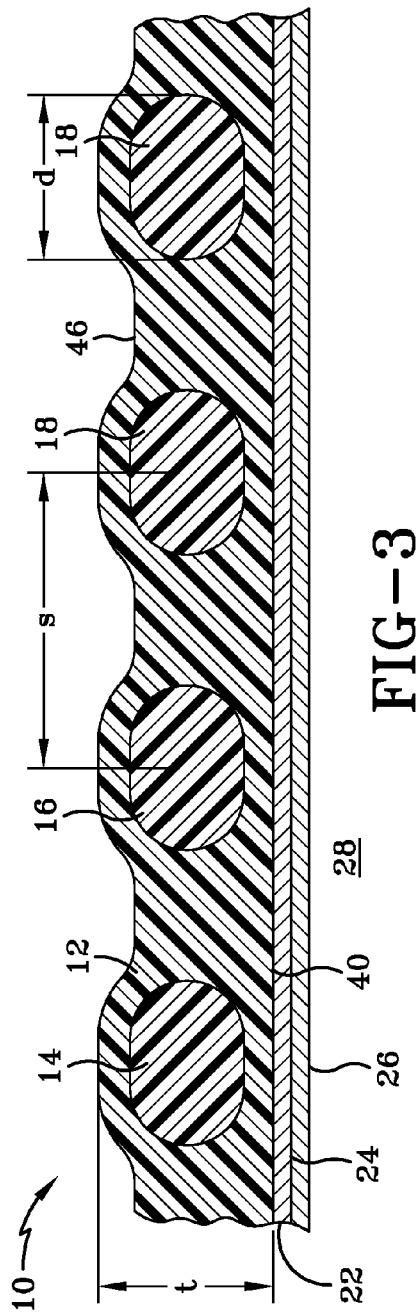
FIG. 3 is a cross-sectional view taken along a vertical section of FIG. 2 showing the inner tubular layer, the fabric reinforcing layer having the special construction of this invention, the outer tubular layer, and helically wound reinforcing strips which are fully embedded within the outer tubular layer.

Each of the reinforcement strips 14, 16, 18, 20 includes a plurality of continuous coils or turns, that are wound with a spiral or helical winding pattern having a helical pitch measured along the central longitudinal axis 30 such that adjacent turns of the different strips 14, 16, 18, 20 are non-contacting and, thereby, separated or spaced apart from each other by a center-to-center or centerline spacing, s. The pitches for the reinforcement strips 14, 16, 18, 20 are approximately equal. The centerline spacing, s, between adjacent pairs of the reinforcement strips 14, 16, 18, 20 may range from about 50 percent of the diameter, d, of the individual turns to about 500 percent of the diameter, d. In a specific embodiment, the centerline spacing, s, for adjacent pairs of the reinforcement strips 14, 16, 18, 20 may be about 100 percent of the diameter, d. The turns of the reinforcement strips 14, 16, 18, 20 may have a geometrical shape with a round cross section as depicted in FIGS. 2 and 3, an oval cross section, a hexagonal cross section, or another suitable cross section. The axial gaps 46 between adjacent turns of the reinforcement strips 14, 16, 18, 20 are filled by the material of the outer cover 12. In an alternative embodiment, the hose 10 may include more or less than four reinforcements strips 14, 16, 18, 20 so long as multiple strips are present.

The cross-sectional area of the reinforcement strips 14, 16, 18, 20, as well as the helical pitch of the reinforcement strips 14, 16, 18, 20, may influence the flexibility of the hose 10 and its strength against flattening and against pressure to resist bursting. Increasing the helical pitch of the reinforcement strips 14, 16, 18, 20 in the axial direction increases the centerline spacing, s, which reduces the flexibility of the hose, and may decrease the strength against flattening and pressure resistance against bursting. Increasing the cross-sectional area of the reinforcement strips 14, 16, 18, 20 increases the crush resistance against flattening but may reduce the flexibility.

In one aspect, the reinforcement strips 14, 16, 18, 20 comprise a high modulus material having a greater initial modulus than a low modulus material forming the outer cover 12. Because of the higher initial modulus, the high modulus material forming the reinforcement strips 14, 16, 18, 20 have a greater rigidity (or lower flexibility) than the low modulus material forming the outer cover 12. As understood by a person having ordinary skill in the art, the initial modulus is a physical property of a material measured from the slope of an engineering stress-strain curve at low strain levels near zero strain. An engineering stress-strain curve is a graph representing an experimental measurement derived from measuring load (i.e., stress) versus extension (i.e., strain) for a sample of a material. The shape and characteristics of the stress-strain curve vary with the type of material. The stress-strain curve features an initial elastic region over an initial range of relatively low applied stresses, followed by a plastic region over another range of moderate applied stresses, and ultimately fractures at a sufficiently high applied stress.

The high modulus material of reinforcement strips 14, 16, 18, 20 may be composed primarily of a rigid thermoplastic elastomer (TPE), which is often referred to as a thermoplastic olefin (TPO). The high modulus material is selected imparts high burst strength, good crush resistance/resilience, and kink resistance to the hose 10. In various embodiments, the high modulus material of reinforcement strips 14, 16, 18, 20 may comprise a compound of a TPE and polypropylene having a composition ranging from about 80 percent by weight TPE to about 5 weight percent TPE. In other embodiments, the formulation for the high modulus material may range from about 20 weight percent TPE to about 5 weight percent TPE. Increasing the percentage by weight of polypropylene in the compound relative to percentage by weight of TPE is believed to increase the kink resistance of the hose 10, but reduce the flexibility. The high modulus material from which the strips 14, 16, 18, 20 are formed may include from 0.5 weight percent to 2.0 weight percent of pigments to provide a color and additives like ultraviolet stabilizers, heat stabilizers, and lubricants.

High modulus material formulations suitable for constructing the reinforcement strips 14, 16, 18, 20 may comprise a compound of a polypropylene homopolymer and a TPE selected from the ENGAGE® family of ethylene-butene copolymers commercially available from The Dow Chemical Company (Midland, Mich.). In one embodiment, these materials are combined in a ratio of about 20 weight percent TPE to about 80 weight percent polypropylene homopolymer. A particularly useful polymer compound for the high modulus material of reinforcement strip 14 includes ENGAGE® ENR 7256 ethylene-butene copolymer and a polypropylene homopolymer, which may be combined in a ratio of about 20 weight percent TPE to about 80 weight percent polypropylene homopolymer. ENGAGE® ENR 7256 is characterized by a density of 0.885 grams per cubic centimeter (ASTM D792), a melt mass flow rate of 2.0 grams per ten minutes (190° C., ASTM D1238), and a tensile strength with a yield of 11.2 MPa when molded and tested in accordance with ASTM D638. A representative polypropylene homopolymer for use in the high modulus material of reinforcement strip 14 comprises H110-02N polypropylene that is commercially available from The Dow Chemical Company (Midland, Mich.). H110-02N polypropylene is characterized by a density of 0.900 grams per cubic centimeter (ASTM D792), a melt mass flow rate of 2.0 grams per 10 minutes (230° C.; ASTM D1238), and a tensile strength with a yield of 35.2 MPa when molded and tested in accordance with ASTM D638.

The high modulus material of reinforcement strips 14, 16, 18, 20 may be selected with a composition that exhibits a minimum initial modulus of about 5,000 psi (34.5 MPa) and a minimum tensile strength of about 1,000 psi (6.8 MPa), or greater. The tensile strength represents the stress at the inflection point or maximum on the engineering stress-strain curve, which corresponds to the maximum stress that can be sustained by a structure in tension. In one embodiment, the high modulus material of reinforcement strip 14 is characterized by an initial modulus of about 40,000 psi (276 MPa) or greater and a tensile strength of about 1,600 psi (11 MPa) or greater. Although not wishing to be limited by theory, the relatively high initial modulus of the high modulus material of reinforcement strips 14, 16, 18, 20 is believed to impart appreciable kink resistance to the hose 10 and the minimum tensile strength of the high modulus material of reinforcement strips 14, 16, 18, 20 is believed to impart appreciable burst strength to the hose 10.

The outer cover 12 operates to protect the inner tubular member 24 and the yarn layer 22 from the environment of the hose 10 when deployed for use in the field. The outer cover 12 also provides adhesion to the inner tubular member 24 that will not allow the yarn layer 22 to move around. The yarn layer 22 includes windows between the constituent filaments that permit the material of the outer cover 12 to contact the inner tubular member 24 and provide a cohesive hose construction.

References herein to terms such as "inner" or "interior" and "outer" or "exterior" refer, respectively, to directions toward and away from the center of the referenced element, and the terms "radial" and "axial" refer, respectively, to directions perpendicular and parallel to the longitudinal central axis of the referenced element are made by way of example, and not by way of limitation, to establish a frame of reference. It is understood that various other reference frames may be employed in describing the subject invention.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1 AND COMPARATIVE EXAMPLE 2

In this experiment, a hose was made utilizing the methodology of this invention and compared to an identical hose that was made utilizing a conventional fabric reinforcing layer. These hoses had an inside diameter of approximately 16 mm and outside diameters of approximately 23 mm. The inner tubular layer in the case of both hoses was made by extruding an SEBS compound having a wall thickness of approximately 1.3 mm. In the case of the experimental hose of this invention, the fabric reinforcing layer was made by winding eighteen separate polyethylene terephthalate polyester yarns at an angle α of 30° with respect to the longitudinal axis of the hose. Three separate polyethylene terephthalate polyester yarns were then wrapped on top of the first plurality of yarns at an angle β of 80° with respect to the longitudinal axis of the hose to make the fabric reinforcing layer which is comprised of a first plurality of eighteen yarns which are wrapped in the direction of α and a second plurality of three yarns which are wrapped in the direction of β. Then the outer tubular layer, including reinforcing strips embedded therein, were applied on top of the fabric reinforcing layer to make the hose. The outer tubular layer made with another SEBS compound and two reinforcing strips were made utilizing TPO. The reinforcing strips were about 2.5 mm in width by 2.5 mm in height and had a helical pitch of 12 mm.

In the case of the control hose, the fabric reinforcing layer was made by winding nine separate polyethylene terephthalate polyester yarns at an angle α of 54.7° with respect to the longitudinal axis of the hose. Nine separate polyethylene terephthalate polyester yarns were then wrapped on top of the first plurality of yarns at an angle β of 54.7° with respect to the longitudinal axis of the hose to make the fabric reinforcing layer which is comprised of a first plurality of nine yarns which are wrapped in the direction of α and a second plurality of nine yarns which are wrapped in the direction of β. Then the outer tubular layer, including reinforcing strips embedded therein, were applied on top of the fabric reinforcing layer to make the hose. The outer tubular layer made with another SEBS compound and two reinforcing strips were made utilizing TPO. The reinforcing strips were about 2.5 mm in width by 2.5 mm in height and had a helical pitch of 12 mm.

The conventional hose was determined to have a bending stiffness of 38.0 psi and a torsional stiffness of 145.4 psi which provides a stiffness ratio of 0.3. The experimental hose of this invention was determined to have a bending stiffness of 40.8 psi and a torsional stiffness of 29.2 psi which provides a stiffness ratio of 1.4.

The conventional hose was attached to a water spigot and was pressurized to approximately 60 psi which is standard commercial water pressure. The hose was pulled from a coil without allowing it to twist in the hand as a gardener or household user would handle it in normal applications. As the hose was pulled, numerous loops formed over the length of the hose eventually leading to several kinks which restricted the flow of water. In the case of the experimental hose which was similarly pressurized and handled, kinks did not form as was the case with the conventional hose. In fact, even after intentionally putting small loops in the hose and pulling, the natural inclination of the hose was to twist rather than kink. Intentional efforts to kink the experimental hose did not result in kink formation due to the fact that the experimental hose torsionally twisted out of loop.

While certain representative embodiments and details have been shown for the purpose of illustrating the subject invention, it will be apparent to those skilled in this art that various changes and modifications can be made therein without departing from the scope of the subject invention.

What is claimed is:

1. A kink, crush and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose, wherein said hose has a ratio of bend stiffness to torsional stiffness which is greater than 1.0.

2. The kink, crush and burst resistant hose of claim 1 wherein the cords in the first plurality of reinforcing cords and the cords in the second plurality of reinforcing cords are spirally wound to form the fabric reinforcing layer.

3. A kink, crush and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose, wherein the cords in the fabric reinforcing layer are in the form of a non-woven matrix.

4. The kink, crush and burst resistant hose of claim 3 wherein all of the cords wound at an angle α either pass over or pass under all of the cords wound at an angle β.

5. The kink, crush, and burst resistant hose of claim 3 wherein the first plurality of reinforcing cords are oriented at an angle α which is within the range of 25° to 35° of the longitudinal axis of the hose, and wherein the second plurality of reinforcing cords are oriented at an angle β which is within the range of 75° to 85° of the longitudinal axis of the hose.

6. The kink, crush, and burst resistant hose of claim 3 wherein the first plurality of reinforcing cords are oriented at an angle α which is within the range of 27° to 33° of the longitudinal axis of the hose, and wherein the second plurality of reinforcing cords are oriented at an angle β which is within the range of 77° to 83° of the longitudinal axis of the hose.

7. The kink, crush and burst resistant hose of claim 4 having a ratio of bend stiffness to torsional stiffness which is greater than 1.2.

8. The kink, crush and burst resistant hose of claim 5 having a ratio of bend stiffness to torsional stiffness which is greater than 1.3.

9. A kink, crush and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose, wherein the inner tubular layer is comprised of a SEBS/TPE compound.

10. The kink, crush and burst resistant hose of claim 1 wherein the outer tubular layer is comprised of SEBS.

11. The kink, crush and burst resistant hose of claim 1 wherein the reinforcing cords are comprised of polyethylene terephthalate.

12. The kink, crush and burst resistant hose of claim 1 wherein the reinforcing strip is comprised of TPO.

13. The kink, crush and burst resistant hose of claim 1 wherein said hose has a ratio of bend stiffness to torsional stiffness which is greater than 1.2.

14. The kink, crush and burst resistant hose of claim 1 wherein said hose has a ratio of bend stiffness to torsional stiffness which is greater than 1.3.

15. A kink, crush and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose, wherein the fabric reinforcing layer is further comprised of at least one longitudinal reinforcing cord.

16. The kink, crush and burst resistant hose of claim 15 wherein a single longitudinal cord is present in the fabric reinforcing layer.

17. A kink, crush and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose, wherein the fabric reinforcing layer includes from 1 to 20 longitudinal reinforcing cords which are present in the fabric reinforcing layer at an angle of separation which is within the range of 2 degrees to 90 degrees.

18. The kink, crush and burst resistant hose of claim 17 wherein the angle of separation is within the range of 5 degrees to 20 degrees.

19. A kink, crush and burst resistant hose having a longitudinal axis and a lumen for conveyance of a fluid comprising (1) an inner tubular layer, (2) a fabric reinforcing layer wherein said fabric reinforcing layer is comprised of a first plurality of reinforcing cords which extend spirally through the hose and are substantially parallel to each other and a second plurality of reinforcing cords which extend spirally through the hose and are substantially parallel to each other, wherein the first plurality of reinforcing cords are oriented at an angle α which is within the range of 20° to 50° of the longitudinal axis of the hose, and wherein the second plurality of reinforcing cords are oriented at an angle β which is within the range of 60° to 85° of the longitudinal axis of the hose, wherein the angle α and the angle β are mutually opposite with respect to the longitudinal axis of the hose (3) an outer tubular layer, and (4) at least one reinforcing strip which is at least partially embedded within the outer tubular layer and helically wound in the direction of β with respect to the orientation of the reinforcing cords and a pitch about the lumen of said hose, wherein the first plurality of reinforcing cords are slack to the extent that they can experience a strain within the range of 0.5% to 4% without exhibiting an increase in the level of stress.

20. The kink, crush and burst resistant hose of claim 19 having a ratio of bend stiffness to torsional stiffness which is greater than 1.2.

* * * * *